United States Patent
Fujii

(10) Patent No.: US 10,033,189 B2
(45) Date of Patent: Jul. 24, 2018

(54) OPERATION CONTROL APPARATUS FOR SOLAR POWER SYSTEM

(71) Applicant: TOSHIBA MITSUBISHI-ELECTRIC INDUSTRIAL SYSTEMS CORPORATION, Tokyo (JP)

(72) Inventor: Yosuke Fujii, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 417 days.

(21) Appl. No.: 14/099,254

(22) Filed: Dec. 6, 2013

(65) Prior Publication Data

US 2014/0092657 A1    Apr. 3, 2014

Related U.S. Application Data

(63) Continuation of application No. PCT/JP2011/063056, filed on Jun. 7, 2011.

(51) Int. Cl.
*H02J 3/38* (2006.01)
*H02M 7/539* (2006.01)

(52) U.S. Cl.
CPC ........... *H02J 3/383* (2013.01); *H02M 7/539* (2013.01); *Y02E 10/563* (2013.01)

(58) Field of Classification Search
CPC ........ H02J 3/383; H02M 7/539; H02M 7/757; Y02E 10/563
USPC ............................................ 363/79; 323/284
See application file for complete search history.

(56) References Cited

U.S. PATENT DOCUMENTS

| | | | |
|---|---|---|---|
| 6,239,997 B1 | 5/2001 | Deng | |
| 7,158,395 B2 * | 1/2007 | Deng | ............... G05F 1/67 363/95 |
| 7,439,714 B2 * | 10/2008 | Llorente Gonzalez | . H02J 3/386 322/24 |

(Continued)

FOREIGN PATENT DOCUMENTS

| | | |
|---|---|---|
| CN | 101789606 | 7/2010 |
| JP | 08-191573 | 7/1996 |

(Continued)

OTHER PUBLICATIONS

Extended European search report from the European Patent Office dated Mar. 3, 2015, for counterpart European Patent Application No. 11867392.0 (7 pages).

(Continued)

*Primary Examiner* — Fred E Finch, III
*Assistant Examiner* — Lorena Bruner
(74) *Attorney, Agent, or Firm* — Finnegan, Henderson, Farabow, Garrett & Dunner, L.L.P.

(57) ABSTRACT

An operation control apparatus includes a criterion calculator that obtains an operation criterion for the power converter, based on the voltage detected by the above voltage detector on the side of the alternating-current power system, a direct-current voltage detector that detects a direct-current output voltage of the solar battery, and an operation determination device that compares the direct-current output voltage detected by the direct-current voltage detector with the operation criterion obtained by the criterion calculator, and supplies the power converter with an operation command if the direct-current output voltage is greater than the operation criterion.

2 Claims, 5 Drawing Sheets

(56) References Cited

U.S. PATENT DOCUMENTS

| | | | | |
|---|---|---|---|---|
| 2009/0121549 A1* | 5/2009 | Leonard | ............... | H02M 3/156 |
| | | | | 307/51 |
| 2009/0302681 A1* | 12/2009 | Yamada | ................... | H02J 7/35 |
| | | | | 307/46 |
| 2012/0235623 A1* | 9/2012 | Ishino | .................. | H01M 10/44 |
| | | | | 320/101 |

FOREIGN PATENT DOCUMENTS

| | | |
|---|---|---|
| JP | 10-052056 | 2/1998 |
| JP | 10-229679 | 8/1998 |
| JP | 3407234 | 3/2003 |
| JP | 3528879 | 3/2004 |
| JP | 2009-284559 | 12/2009 |

OTHER PUBLICATIONS

International Preliminary Report on Patentability and Written Opinion issued by the International Bureau of WIPO dated Dec. 27, 2013, for International Patent Application No. PCT/JP2011/063056.
International Search Report from the European Patent Office for International Application No. PCT/JP2011/063056, dated Feb. 21, 2012.
Second Office Action from The State Intellectual Property Office of People's Republic of China dated Nov. 19, 2015, for counterpart Chinese Patent Application No. 201180071471.6, and English translation thereof (15 pages total).

* cited by examiner

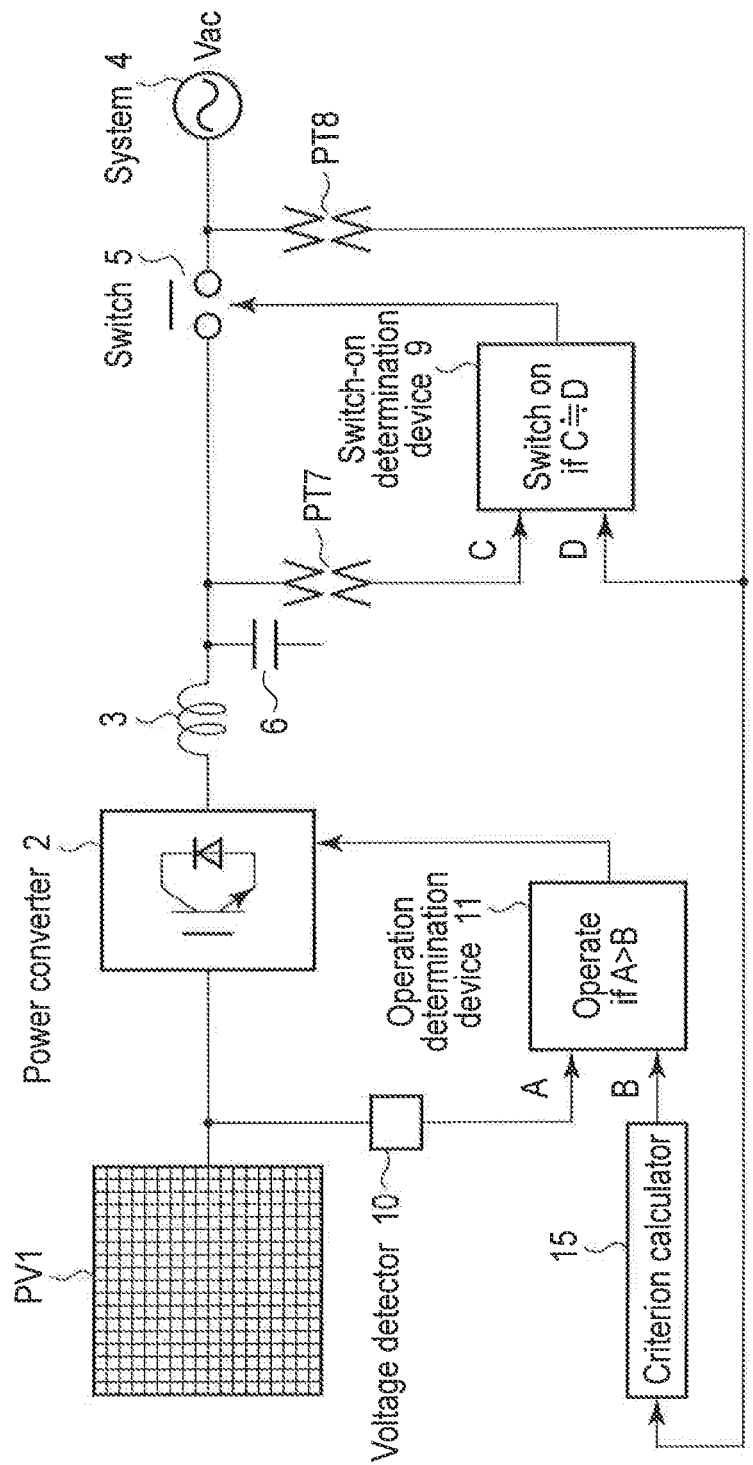
F I G. 1

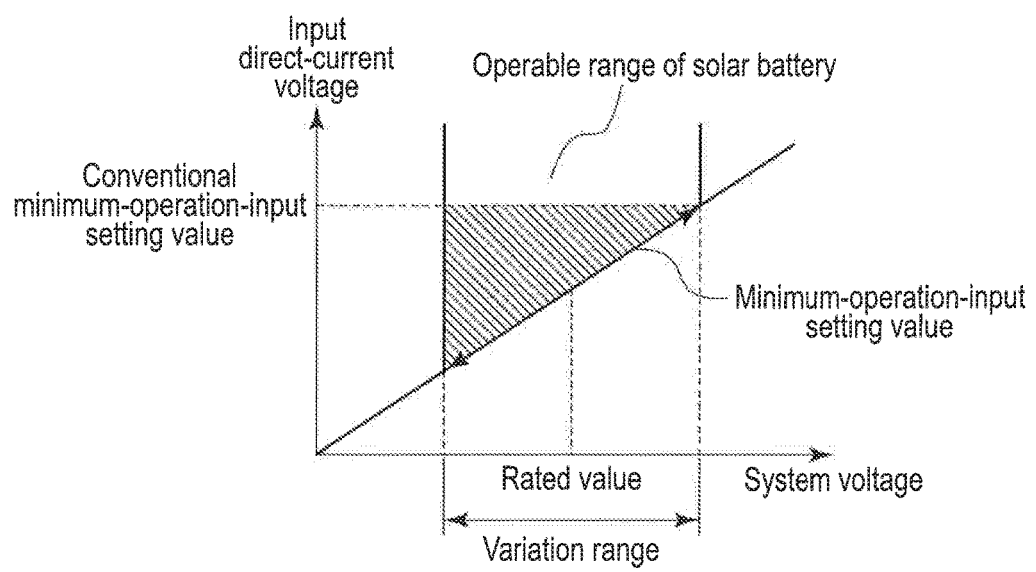
F I G. 2

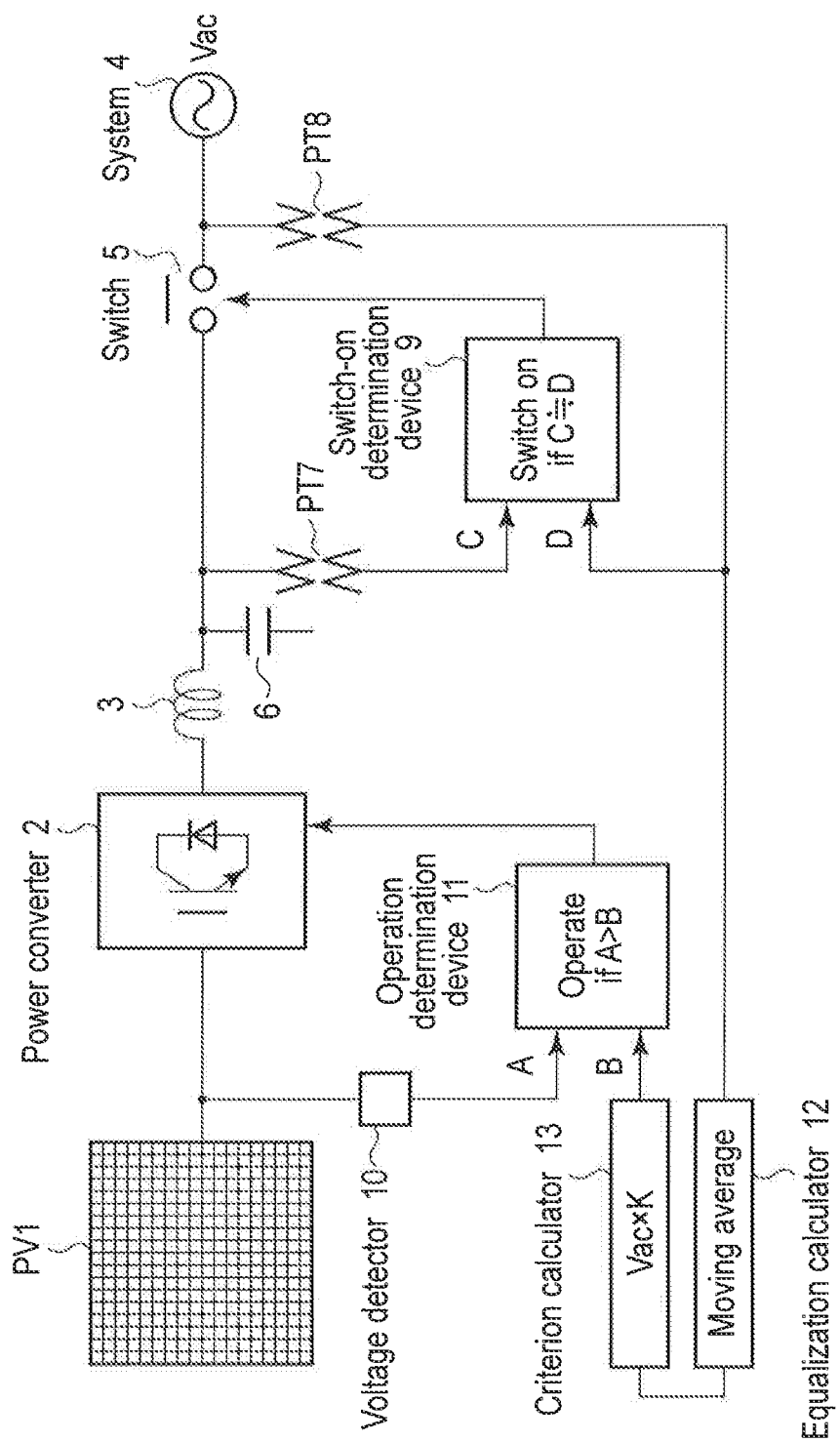
F I G. 4

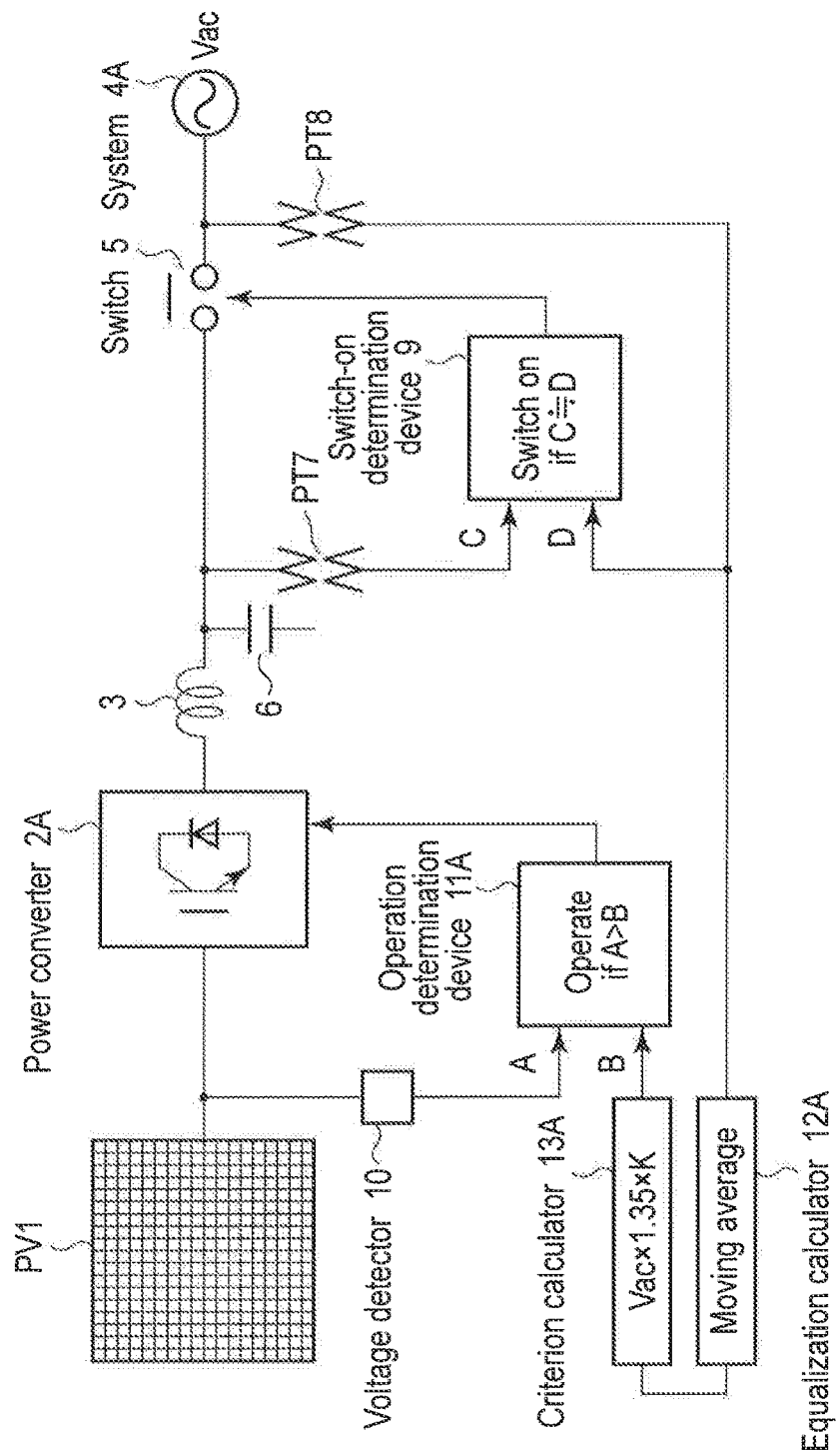
F I G. 5

OPERATION CONTROL APPARATUS FOR SOLAR POWER SYSTEM

CROSS-REFERENCE TO RELATED APPLICATIONS

This application is a Continuation Application of PCT Application No. PCT/JP2011/063056, filed Jun. 7, 2011, the entire contents of which are incorporated herein by reference.

BACKGROUND OF THE INVENTION

1. Field of the Invention

The invention relates to an operation control apparatus for a power converter (power conditioner) in a solar power system.

2. Description of the Related Art

Patent Literature 1 discloses, as capability to effectively use generated power of a solar battery, an invention which suppresses a voltage rise at a power reception point connected to a power converter and to a power system, by making an ineffective phase advance current constantly flow while maintaining an effective current output.

Patent Literature 2 describes that an upper limit and a lower limit are provided for a link point in order that an output power of a dispersed power supply which is operated in cooperation with a power system is restricted from greatly hunting to maintain a constant link point voltage. When the link point voltage is within the limits, the link point voltage is restricted to be not greater than the upper limit, by continuing both controls (Normally, operation is performed to output the maximum power at a power ratio of 100%. Only when the link point voltage exceeds a limit, an effective power and an ineffective phase advance voltage are controlled to restrict the link point voltage). Only when the link point voltage is not greater than the lower limit, normal operation is recovered in which the maximum power at the power ratio of 100% is output.

Conventionally, there is a problem as follows in a system which converts direct-current power generated from a solar battery into alternating-current power by a power converter (power conditioner) and supplies the power to an alternating-current power system. In the power converter, power conversion is not performed unless a direct-current voltage from a solar power generation apparatus exceeds a minimum value (lower limit) when an alternating-current voltage is supplied to an alternating-current power system. The minimum value (lower limit) in this case is a value which is marginally tolerable. However, since voltage fluctuation occurs on the alternating-current side, effective use of the generated power from the solar battery is not achieved.

When the direct-current voltage which is an input voltage of the power converter exceeds the minimum value (lower limit), the power converter is operated but the minimum value (lower limit) of the direct-current voltage is still fixed. Here, the minimum value (lower limit) of the direct-current voltage is determined to be the value when the solar power generation apparatus is under the worst conditions.

CITATION LIST

Patent Literature

Patent Literature 1: Japanese Patent No 3528879
Patent Literature 2: Japanese Patent No. 3407234

BRIEF SUMMARY OF THE INVENTION

Object to be Achieved by the Invention

Although the power converter can be operated in actual when the direct-current voltage as the output of the solar battery is low, the minimum value (lower limit) of the direct-current voltage is still fixed in the system, at present. As a result, even when the solar battery generates electricity, the generated power of the solar battery is wasted if the power converter is not operated.

The invention has an object of providing an operation control apparatus in a solar power system, which can extend an operation range of a power converter and can effectively use generated power of a solar battery.

Means to Achieve the Object

To achieve the object, the invention provides an operation control apparatus for a solar power system that performs power conversion on direct-current power from a solar battery by a power converter, supplies an alternating-current power system with the power converted, and comprises a switch at a link point between the power converter and the alternating-current power system, the operation control apparatus comprising: a voltage detector that detects a voltage of the switch on a side of the power converter, and a voltage thereof on a side of the alternating-current power system; a switch-on determination device that is input with the voltages from the voltage detector on the sides of the power converter and the alternating-current power system, and supplies the switch with a switch-on command if both of the voltages are approximately equal to each other; a criterion calculator that obtains an operation criterion for the power converter, based on the voltage detected by the above voltage detector on the side of the alternating-current power system; a direct-current voltage detector that detects a direct-current output voltage of the solar battery; and an operation determination device that compares the direct-current output voltage detected by the direct-current voltage detector with the operation criterion obtained by the criterion calculator, and supplies the power converter with an operation command if the direct-current output voltage is greater than the operation criterion.

To achieve the object, the invention provides an operation control apparatus for a solar power system that converts direct-current power from a solar battery into a single-phase alternating-current power by a power converter, supplies an alternating-current power system with the single-phase alternating-current power converted, and comprises a switch at a link point between the power converter and the alternating-current power system, the operation control apparatus comprising: a voltage detector that detects a single-phase alternating-current voltage of the switch on a side of the power converter, and a voltage thereof on a side of the alternating-current power system; a switch-on determination device that is input with the voltages from the voltage detector on the sides of the power converter and the alternating-current power system, and supplies the switch with a switch-on command if both of the voltages are approximately equal to each other; a criterion calculator that obtains an operation criterion for the power converter, by multiplying, by a margin, a moving average voltage detected by the voltage detector on the side of the alternating-current power system; a direct-current voltage detector that detects a direct-current output voltage of the solar battery; and an operation determination device that compares the direct-current output voltage detected by the direct-current voltage detector with the operation criterion obtained by the criterion calculator, and supplies the power converter with an operation command if the direct-current output voltage is greater than the operation criterion.

To achieve the object, the invention provides an operation control apparatus for a solar power system that converts direct-current power from a solar battery into a three-phase alternating-current power by a power converter, supplies an alternating-current power system with the three-phase alternating-current power converted, and comprises a switch at a link point between the power converter and the alternating-current power system, the operation control apparatus comprising: a voltage detector that detects a voltage of the switch on a side of the power converter, and a voltage thereof on a side of the alternating-current power system; a switch-on determination device that is input with the voltages from the voltage detector on the sides of the power converter and the alternating-current power system, and supplies the switch with a switch-on command if both of the voltages are approximately equal to each other; a criterion calculator that obtains an operation criterion for the power converter, by multiplying, by 1.35 and a margin, a moving average voltage detected by the voltage detector on the side of the alternating-current power system; a direct-current voltage detector that detects a direct-current output voltage of the solar battery; and an operation determination device that compares the direct-current output voltage detected by the direct-current voltage detector with the operation criterion obtained by the criterion calculator, and supplies the power converter with an operation command if the direct-current output voltage is greater than the operation criterion.

Effect of Invention

According to the invention as described above, the operation range of the power converter (inverter) can be extended by fluctuating a minimum-input-operation setting value for a solar battery in accordance with the voltage of an alternating-current power system.

The operation range of the power converter is widened, and the power converter starts up in a shorter time. Therefore, the amount of total power generation can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram for explaining the first embodiment of the invention;

FIG. 2 is a graph for explaining operation of a power converter of FIG. 1;

FIG. 4 is a schematic diagram for explaining the second embodiment of the invention; and FIG. 5 is a schematic diagram for explaining the second embodiment of the invention.

DETAILED DESCRIPTION OF THE INVENTION

Figure 3:
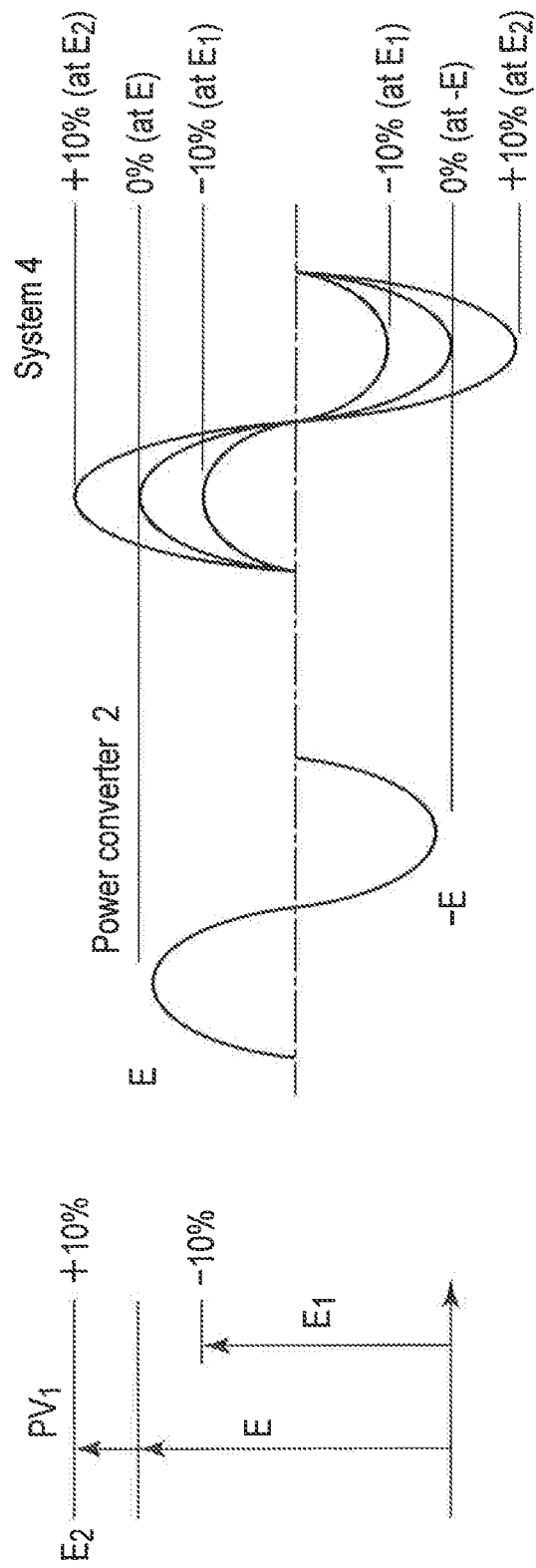
FIG. 3 is a graph for explaining operation of FIG. 1.

Hereinafter, embodiments of the invention will be described with reference to the drawings. In the invention, a solar power system performs power conversion on direct-current power from a solar battery (PV) 1 by a power converter 2, such as an inverter, and supplies the converted power to an alternating-current power system 4. The solar power system comprises a switch 5 at a link point between the power converter 2 and the alternating-current power system 4. A reactor 3 is connected in series with a connection bus line between the power converter 2 and the switch 5, and a capacitor 6 is connected in parallel with the connection bus line. The solar power system is configured as follows.

An operation control apparatus for a solar power system comprises: an alternating-current voltage detector (for example, PT) 7 which detects a voltage on a side of the power converter 2 of the switch 5 or more specifically between the capacitor 6 and the switch 5; an alternating-current voltage detector (for example, PT) 8 which detects a voltage on the side of the alternating-current power system 4 or more specifically between the alternating-current power system 4 and the switch 5; a switch-on determination device 9 which is input with a voltage C detected by the voltage detector 7 and a voltage D detected by the voltage detector 8, and supplies the switch 5 with a switch-on command if both voltages are approximately equal to each other; a criterion calculator 15 which obtains an operation criterion for the power converter 2, based on a moving average voltage detected by the voltage detector 8; a direct-current voltage detector 10 which detects a direct-current output voltage of the solar battery 1; and an operation determination device 11 which compares a direct-current output voltage A detected by the direct-current voltage detector 10 with an operation criterion B obtained by the criterion calculator 15, and supplies the power converter 2 with an operation command if the direct-current output voltage A is greater than the operation criterion B.

The moving average voltage is a value obtained by dividing, by time, a sum of instantaneous values of the voltage detected by the voltage detector 8 within a time band.

FIG. 2 is a graph for explaining operation of the power converter 2, in which the vertical axis represents an input direct-current voltage of the power converter 2, as a direct-current output voltage of the solar battery 1, and the horizontal axis represents a system voltage of the alternating-current power system 4. In FIG. 2, a conventional solar power system needs to consider an upper-limit system voltage in setting up a minimum operation range of the power converter 2. Therefore, direct-current power from the solar battery 1 cannot be effectively used in a hatched range of FIG. 2.

According to the embodiment described above, as the input voltage to the alternating-current power system 4, which is detected by the voltage detector 8, varies, a criterion B as a moving average voltage calculated by the criterion calculator 15 varies. When the direct-current output voltage A of the solar battery 1 which is detected by the voltage detector 10 satisfies the condition A>B, an operation command is supplied from the operation determination device 11 to the power converter 2. The power converter 2 then transits to an operating state and the switch 5 transits to a switch-on state. As a result, the direct-current power generated by the solar battery 1 is supplied to the alternating-current power system 4.

Thus, the minimum-operation-input setting value (minimum-input-operation setting value) for the power converter 2 is varied in accordance with variation of the input voltage to the alternating-current power system 4. In accordance with the varied value, the power converter 2 is operated. The direct-current power generated from the solar battery 1 can be used even within the hatched range in FIG. 2 where the power cannot be used in the prior art. Therefore, the operation range widens and can improve total conversion efficiency throughout the solar power system. Another advantage is that the startup time of the power converter 2 is reduced.

The invention obtains a moving average of the voltage of the alternating-current power system 4 described above. The rated voltage Vac of the alternating-current power system 4 is compensated for up to ±10%. For example, when the rated voltage Vac in FIG. 3 is at +10%, compensation cannot be achieved with a direct-current voltage E of the solar battery 1 in FIG. 3. Therefore, the direct-current voltage E is improper unless the direct-current voltage E is at +10% to become E2. Unless the solar battery 1 is +10%, the power converter 2 is not operated. Since variation of E is 0%, the solar battery 1 can operate. At −10%, operation can be achieved even with E1.

Conventionally, the voltage of the alternating current power system 4 compensates for +10% of Vac. Therefore, the power converter 2 does not operate unless the solar battery 1 supplies the voltage E2. The solar power system is designed to operate only when the power converter 2 can supply ±10% of Vac. The highest peak of the direct-current output voltage of the solar battery 1 is selected. At a voltage not smaller than the maximum output voltage of the solar battery 1, the power converter 2 can be operated.

The invention considers variation of the system voltage of the alternating-current power system 4 as described above, to make the output voltage of the solar battery 1 be supplied to the side of the alternating-current power system 4. The solar battery 1 is started in view of the input voltage on the side of the alternating-current power system 4. Since the voltage of the alternating-current power system 4 varies, for example, an average value is obtained for waveforms for a number of cycles. For example, after checking an average value of 0% or +10%, the power converter 2 and the solar battery 1 are operated. Otherwise, the output voltage of the solar battery 1 may drop during actual operation after instantaneously exceeding the value. Therefore, for example, an average value is obtained at 10 and 100 Hz.

FIG. 4 is a schematic diagram for explaining the second embodiment of the invention, which differs from the first embodiment in that a criterion calculator 15 is substituted with an equalization calculator 12 and a criterion calculator 13 and that an alternating-current power system 4 is of a single-phase type. The equalization calculator 12 obtains a single-phase alternating-current voltage detected by the voltage detector 8, for example, a moving average value Vac of a voltage within predetermined time. The criterion calculator 13 multiplies the moving average value Vac by a margin K (for example, 0.9 to 0.95), thereby to obtain an operation determination value B. Except for the feature described above, the configuration, operation, and effects are the same as those of the foregoing first embodiment, and descriptions thereof will therefore be omitted.

FIG. 5 is a schematic diagram for explaining the third embodiment of the invention, which differs from the first embodiment in that a criterion calculator 15 is substituted with an equalization calculator 12A and a criterion calculator 13A and that an alternating-current power system 4A is of a three-phase type. The equalization calculator 12A obtains a moving average value Vac of a three-phase alternating-current voltage detected by a voltage detector 8, for example, a three-phase voltage within predetermined time. The criterion calculator 13A multiplies the moving average value Vac by 1.35 and a margin K, to thereby obtain an operation determination value B. Except for the feature described above, the configuration, operation, and effects are the same as those of the foregoing first embodiment, and descriptions thereof will therefore be omitted.

The foregoing embodiments have been described with reference to an example in which a pure reactor 3 is provided between an output side of the power converter 2 and the switch 5. Even a reactor which has an insulating function, such as an inverter transformer, can be embodied in the same manner as in the foregoing embodiments.

The switch-on condition for the switch-on determination device 9 in the embodiments described above is that a switch-on command is supplied to the switch 5 when the detection value C of the voltage detector 7 provided between the capacitor 6 and the switch 5, and the detection value D of the voltage detector 8 provided between the switch 5 and the alternating-current power system 4 are approximately equal to each other, for example, when voltages, phases, and frequencies are approximately equal. However, the configuration may be arranged so as to experimentally obtain these values insofar as a condition of causing neither occurrence of current surge nor flow of overcurrent is satisfied when the switch 5 is switched on.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An operation control apparatus for a solar power system that converts direct-current power from a solar battery into single-phase alternating-current power by a power converter, supplies an alternating-current power system with the single-phase alternating-current power converted, and comprises a switch at a link point between the power converter and the alternating-current power system, the operation control apparatus comprising:

a voltage detector that detects a single-phase alternating-current first voltage of the switch on a side the power converter, and a second voltage thereof on a side of the alternating-current power system;

a switch-on determination device that is input with the first and second voltages from the voltage detector on the sides of the power converter and the alternating-current power system, and supplies the switch with a switch-on command if both of the first and second voltages are approximately equal to each other;

a criterion calculator that obtains a voltage magnitude operation criterion for the power converter, by multiplying, by a margin, a moving average voltage of the magnitude of the second voltage detected by the voltage detector on the side of the alternating-current power system;

a direct-current voltage detector that detects a direct-current output voltage value of the solar battery; and an operation determination device that compares the direct-current output voltage value detected by the direct-current voltage detector with the voltage magnitude operation criterion obtained by the criterion calculator, and supplies the power converter with a command to begin operation if the direct-current output voltage value is greater than the voltage magnitude operation criterion.

2. An operation control apparatus for a solar power system that converts direct-current power from a solar battery into a three-phase alternating-current power by a power converter, supplies an alternating-current power system with the three-phase alternating-current power converted, and comprises a switch at a link point between the power converter and the alternating-current power system, the operation control apparatus comprising:

a voltage detector that detects a first voltage of the switch on a side of the power converter, and a second voltage thereof on a side of the alternating-current power system;

a switch-on determination device that is input with the first and second voltages from the voltage detector on the sides of the power converter and the alternating-current power system, and supplies the switch with a switch-on commend if both of the first and second voltages are approximately equal to each other;

a criterion calculator that obtains a voltage magnitude operation criterion for the power converter, by multiplying, by 1.35 and a margin, a moving average voltage of the magnitude of the second voltage detected by the voltage detector on the side of the alternating-current power system;

a direct-current voltage detector that detects a direct-current output voltage value of the solar battery; and an operation determination device that compares the direct-current output voltage value detected by the direct-current voltage detector with the voltage magnitude operation criterion obtained by the criterion calculator, and supplies the power converter with a command to begin operation if the direct-current output voltage value is greater than the voltage magnitude operation criterion.

\* \* \* \* \*

UNITED STATES PATENT AND TRADEMARK OFFICE
CERTIFICATE OF CORRECTION

PATENT NO. : 10,033,189 B2
APPLICATION NO. : 14/099254
DATED : July 24, 2018
INVENTOR(S) : Yosuke Fujii Page 1 of 1

It is certified that error appears in the above-identified patent and that said Letters Patent is hereby corrected as shown below:

In the Claims

Claim 1, Column 6, Lines 51-52, change "the switch on a side the power converter" to --the switch on a side of the power converter--.

Signed and Sealed this
Eleventh Day of December, 2018

Andrei Iancu
*Director of the United States Patent and Trademark Office*